(12) United States Patent
Bogdan

(10) Patent No.: US 6,262,733 B1
(45) Date of Patent: *Jul. 17, 2001

(54) METHOD OF STORING AND PROVIDING ICONS ACCORDING TO APPLICATION PROGRAM CALLS AND USER-PROMPTED SYSTEM METRIC CHANGES

(75) Inventor: Jeffrey L. Bogdan, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/495,739

(22) Filed: Feb. 1, 2000

Related U.S. Application Data

(62) Division of application No. 08/680,584, filed on Jul. 10, 1996, now Pat. No. 6,031,534, which is a continuation of application No. 08/354,918, filed on Dec. 13, 1994, now Pat. No. 5,903,265, which is a continuation-in-part of application No. 08/054,567, filed on Apr. 28, 1993, now Pat. No. 5,977,966.

(51) Int. Cl.$^7$ ................................. G06F 3/14; G06T 3/40
(52) U.S. Cl. ......................... 345/348; 345/335; 345/334; 345/439; 709/328
(58) Field of Search ................................... 345/348, 335, 345/333, 334, 340, 339, 342, 439, 127, 131, 523, 525, 509; 709/328, 323, 320

(56) References Cited

U.S. PATENT DOCUMENTS

| | | | |
|---|---|---|---|
| 4,866,638 | 9/1989 | Cosentino et al. | 345/335 |
| 5,001,697 | 3/1991 | Torres | 345/439 |
| 5,041,992 | 8/1991 | Cunningham et al. | 345/435 |
| 5,121,477 | 6/1992 | Koopmans et al. | 345/333 |
| 5,208,910 | 5/1993 | Higgins et al. | 345/352 |
| 5,276,797 | 1/1994 | Bateman et al. | 345/352 |
| 5,297,250 | 3/1994 | Leroy et al. | 345/333 |
| 5,327,529 * | 7/1994 | Fults et al. | 345/335 |
| 5,335,320 * | 8/1994 | Iwata et al. | 717/4 |
| 5,347,627 | 9/1994 | Hoffmann et al. | 345/334 |
| 5,388,202 * | 2/1995 | Squires | 345/334 |
| 5,404,441 | 4/1995 | Satoyama | 345/334 |
| 5,425,140 | 6/1995 | Bloomfield et al. | 345/353 |
| 5,430,836 * | 7/1995 | Wolf et al. | 345/335 |
| 5,515,496 | 5/1996 | Kaehler et al. | 345/334 |
| 5,517,606 | 5/1996 | Matheny et al. | 345/348 X |
| 5,544,288 | 8/1996 | Morgan et al. | 345/342 |
| 5,588,105 | 12/1996 | Foster et al. | 345/333 X |
| 5,600,778 | 2/1997 | Swanson et al. | 345/333 |
| 5,603,034 * | 2/1997 | Swanson | 345/333 X |
| 5,903,265 | 5/1999 | Bogdan | 345/334 |

FOREIGN PATENT DOCUMENTS 0 212 016   3/1987 (EP).

OTHER PUBLICATIONS

P.W. Munsch et al., "HPIVI Application Program Interface Design," *Hewlett–Packard Journal*, vol. 41 (5), Oct. 1990, pp. 21–31.

Microsoft® Windows™ User's Guide, Version 3.0, for the Windows Graphical Environment, Microsoft Corporation, 1990, pp. 56–62, 145–158, and 232.

"Dynamic Sizing for Graphical Control Objects," *IBM Technical Disclosure Bulletin*, vol. 32 (9B), Feb. 1990, p. 85.

Myers et al., "Garnet, Comprehensive Support for Graphical, Highly Interactive User Interfaces," *Computer*, vol. 23 (11), Nov. 1990, pp. 71–83.

"Variable Size Window Elements," *Research Disclosure*, Havant, Great Britain, No. 297, Jan. 1989, p. 28.

* cited by examiner

*Primary Examiner*—Raymond J. Bayerl
(74) *Attorney, Agent, or Firm*—Christensen O'Connor Johnson Kindness PLLC

(57) ABSTRACT

An operating system provides a number of window elements that the operating system itself or applications may use in displaying a window. The operating system includes a dialog box for enabling a user to adjust the individual sizes of the respective window elements independently of the size of the window. The bitmaps for the window elements are stored in a cache that is re-drawn each time the user changes the size of any of the window elements.

6 Claims, 5 Drawing Sheets

METHOD OF STORING AND PROVIDING ICONS ACCORDING TO APPLICATION PROGRAM CALLS AND USER-PROMPTED SYSTEM METRIC CHANGES

CROSS-REFERENCE TO RELATED APPLICATION

This application is a divisional of prior application No. 08/680,584, filed on Jul. 10, 1996, now U.S. Pat. No. 6,031,534, which in turn is a continuation of application No. 08/354,918, filed Dec. 13, 1994, now U.S. Pat. No. 5,903,265 which in turn is a continuation-in-part application to Ser. No. 08/054,567, filed Apr. 28, 1993, now U.S. Pat. No. 5,977,966.

TECHNICAL FIELD

The present invention relates generally to data processing systems and, more particularly, to user interfaces for data processing systems.

BACKGROUND OF THE INVENTION

The WINDOWS, Version 3.1, Operating System, sold by Microsoft Corporation of Redmond, Wash., provides resources to application programs for generating windows on a visual display. In particular, the operating system provides bitmaps for the window elements. As a result, every window that is generated by the application programs has a similar appearance. In order to understand what kind of bitmaps the operating system stores for window elements, it is helpful to first review what kind of elements are typically included in a window.

FIG. 1 shows an example of a typical window 10 generated by an application program. The window 10 includes a system menu box 12, which may be opened by a user to display a list of system commands available to the user. The window 10 also includes a caption or title bar 14 that displays a title or a caption for the application program that is executing. A menu bar 16 is included in the window 10 to display application commands that the user may perform in the current application. A minimize button 18 and a maximize button 20 are also provided in the window 10 to allow a user to minimize or maximize the size of the window. When maximized, the window 10 occupies most of the video display screen. When minimized, the window 10 appears as an icon. The window 10 also includes a sizing border 22 which may be dragged using a pointing device, such as a mouse, to adjust the size of the window 10. The window 10 additionally includes a client area 24 in which the application program may display output.

The window 10, likewise, includes scroll bars 26 for scrolling through the contents of a document that is displayed in the client area 24. A vertical scroll bar and a horizontal scroll bar are included in the window 10 of FIG. 1. Each of the scroll bars 26 includes a scroll box or a thumb 29 that travels the length of the scroll bar to indicate the current position of the displayed document that is shown in the client area 24 relative to the entire contents of the document being displayed. Scroll bar arrows 28 are provided at each end of the scroll bars 26. A user may click a mouse on the arrows at the respective ends to seroll the contents displayed on the screen in the direction of the arrow.

The operating system provides bitmaps for the system menu button 12, the minimize button 18, the maximize button 20, scroll bar arrows 28, and any check boxes, radio buttons, menu arrows or menu check marks that are included in the window. When the window 10 is resized, such as through dragging of sizing border 22 as described above, the window elements provided by the operating system do not change in size (except that in certain instances, the height of the vertical scroll bar 26 and the length of the horizontal scroll bar may change). Since these window elements provided by the operating system do not change when the window 10 is resized, the bitmaps for the window elements do not need to be updated after the window is resized.

FIG. 2 is a flowchart illustrating the steps that are performed by the operating system to allow application programs to use the bitmaps for the system-provided elements of a window. The bitmaps are initially stored in a display driver for the video display. The display driver is typically part of the operating system and must comply with standards that permit its use in the operating system. During initialization of the operating system, the display driver is loaded into memory (step 30). The bitmaps held in the display driver are then transferred using the BitBlt( ) function into a cache (step 32). Subsequently, when an application program wishes to draw a window on the video display, the application program retrieves the bitmaps from the cache and uses the bitmaps to draw the system-provided window elements (step 34).

SUMMARY OF THE INVENTION

In accordance with a first aspect of the present invention, a method is practiced in a data processing system that has an output device, such as a video display or printer, a memory means-holding a copy of an operating system that includes a bitmap of a window element and a processor running the operating system. In this method, the bitmap of the window element is re-drawn to have a new size in response to a request by a user. The re-drawn bitmap is stored as part of the operating system in the memory means. The re-drawn bitmap is then used to output the window element on the output device as part of a window. The window element may be any of a number of different system-provided window elements, including a system menu, a minimize box, a maximize box, or a scroll bar arrow.

DETAILED DESCRIPTION OF THE INVENTION

A preferred embodiment of the present invention allows a user to customize the size of window elements provided by an operating system ("system-provided window elements").

The window elements may be used by the operating system as well as application programs that are run on the operating system. The size of the system-provided window elements may be adjusted independently of the window size.

Figure 3:
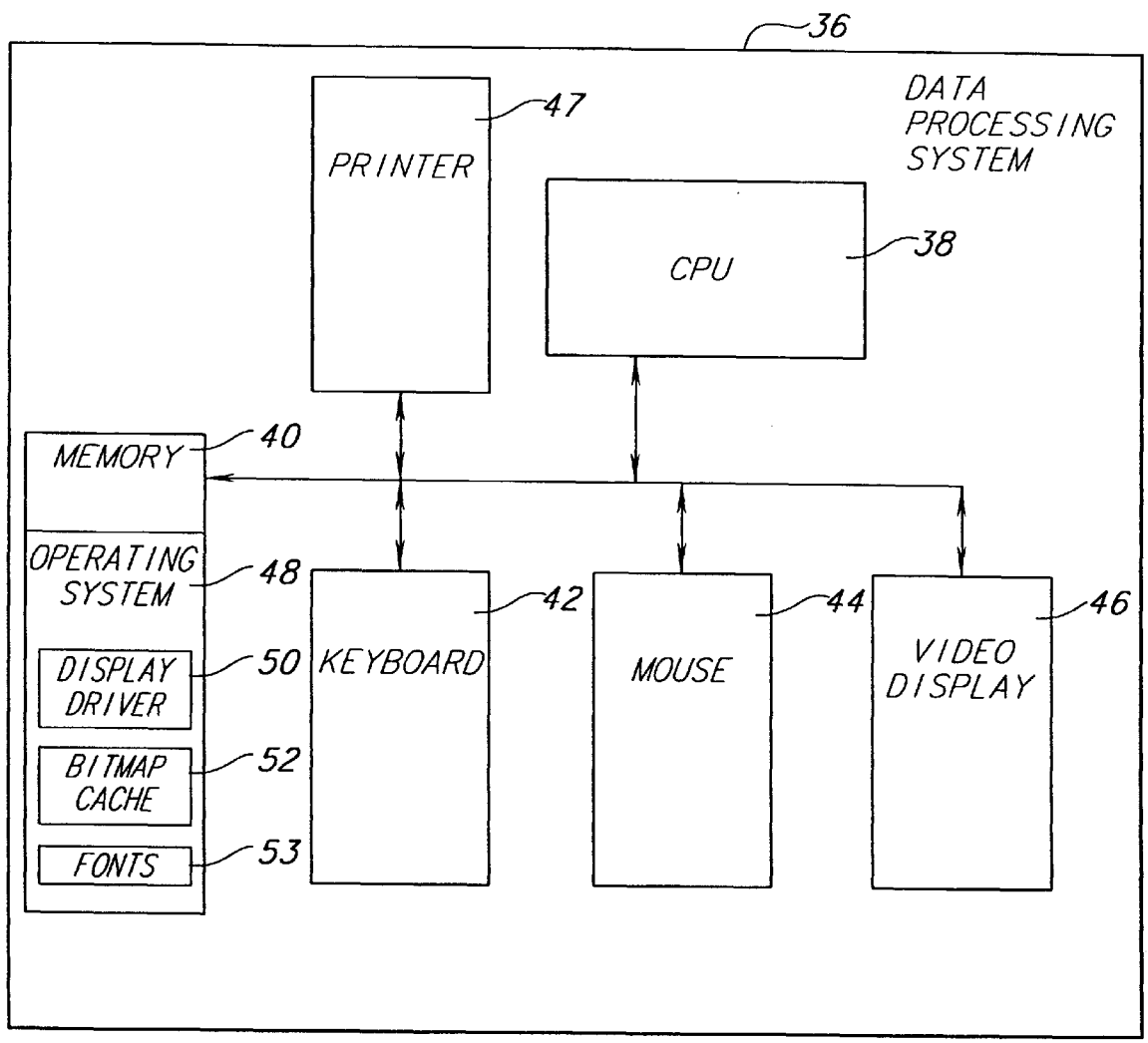
FIG. 3 is a block diagram of a data processing system suitable for practicing a preferred embodiment of the present invention.

FIG. 3 shows a block diagram of data processing system 36 suitable for practicing the preferred embodiment of the present invention. The data processing system includes a central processing unit (CPU) 38, a memory 40, a keyboard 42, a mouse 44 and a video display 46. Those skilled in the art will appreciate that the present invention need not be practiced in a single processor system but rather may also be practiced in a multiple processor system, such as a distributed system. Further, those skilled in the art will appreciate that the data processing system may include alternative input/output devices that differ from those shown in FIG. 3.

The memory 40 holds a number of items, including a copy of an operating system 48. The operating system 48 in the preferred embodiment of the present invention is an embellished version of the Microsoft WINDOWS, Version 3.1, Operating System that supports such resizing of system-provided window elements. Nevertheless, those skilled in the art will recognize that other operating systems may be used in the present invention. The operating system 48 includes at least one display driver 50 and a bitmap cache 52 for storing the bitmaps of the system-provided window elements. The operating system 48 also includes a number of fonts 53 for use by the operating system and application programs.

Figure 1:
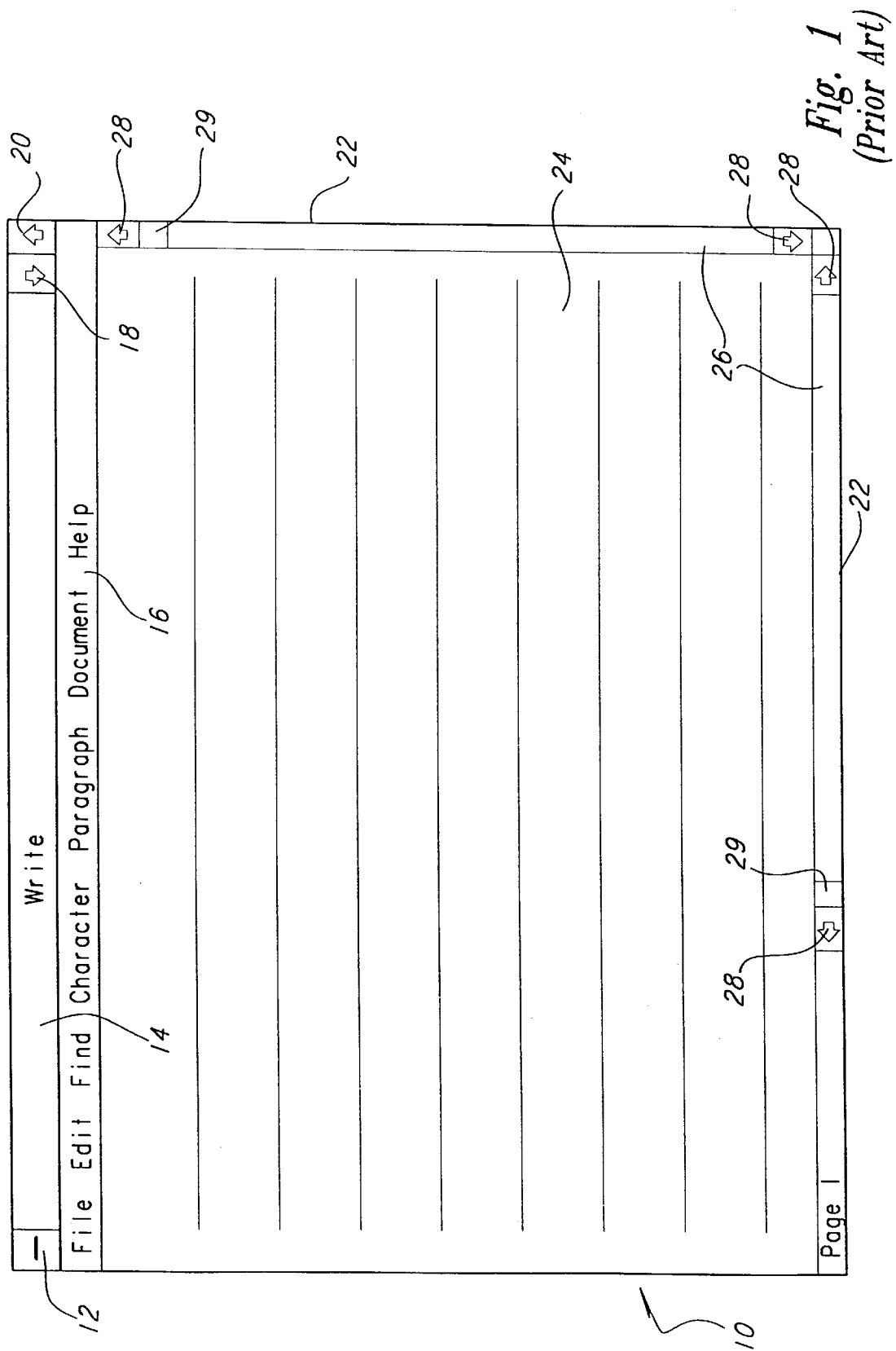
FIG. 1 is a diagram of a conventional window.
Figures 2, 4:
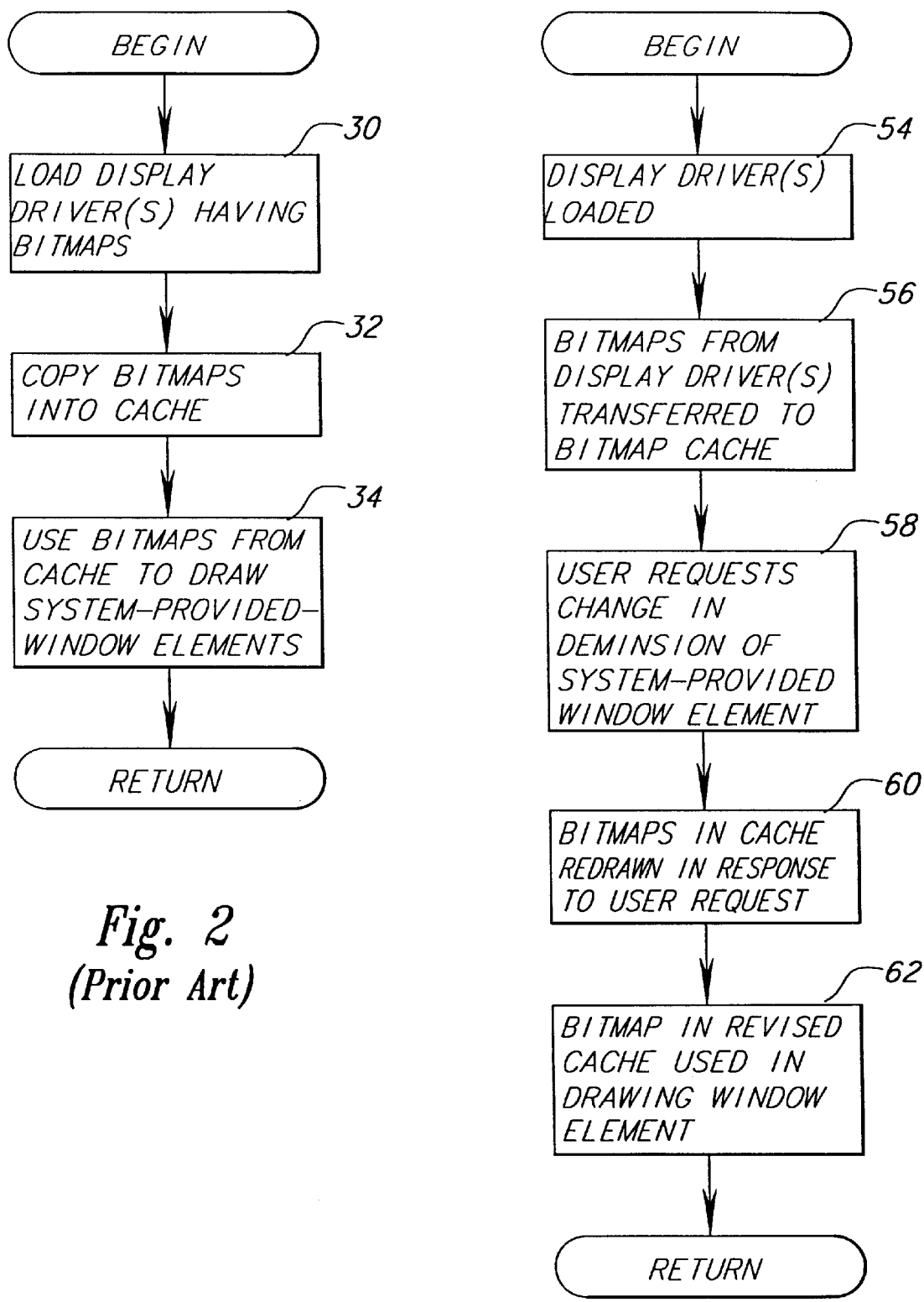
FIG. 2 is a flowchart illustrating how a conventional system obtains bitmaps for system-provided window elements.
FIG. 4 is a flowchart illustrating the steps that are performed by the preferred embodiment of the present invention to provide adjustable size window elements.

FIG. 4 is a flowchart illustrating an overview of the steps performed by the preferred embodiment of the present invention to facilitate resizing of system-provided window elements. The display driver or drivers for output devices, such as the video display 46 or the printer 47 (FIG. 1) are loaded into the memory 40 (Step 54 in FIG. 4). The bitmaps are then transferred using the BitBlt( ) function (such as described in the Background of the Invention) from the display drivers to the bitmap cache 52 (step 56).

Figure 5:
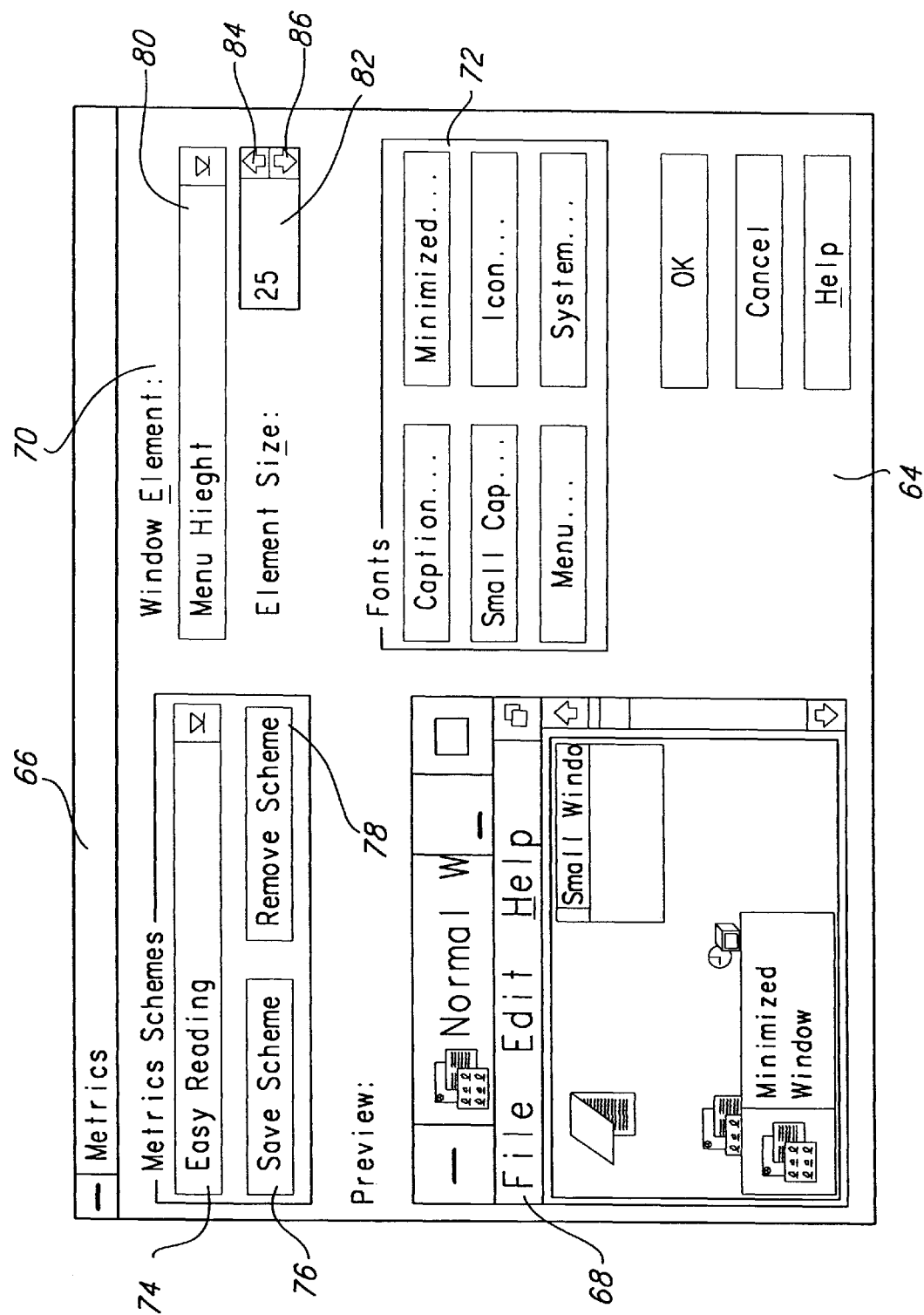
FIG. 5 is a diagram of a dialog box for adjusting the sizes of system-provided window elements in accordance with the preferred embodiment of the present invention.

The preferred embodiment of the present invention allows the user to change at least one dimension of each system-provided window element (step 58 in FIG. 4) by using a dialog box 64, like that shown in FIG. 5. The dialog box 64 includes a section 66 that concerns metrics schemes, a section 68 that concerns a preview of window elements, a section 70 concerning system-provided window elements and a section 72 concerning fonts.

Before discussing the dialog box 64 in more detail, it is helpful to review what "system metrics" are in the operating system 48. The system metrics, among other things, hold information about the size of system-provided window elements. The system metrics include the following that relate to window elements:

| | |
|---|---|
| SM_CXSCREEN | Screen width in pixels |
| SM_CYSCREEN | Screen height in pixeis |
| SM_CXVSCROLL | Vertical scroll arrow width |
| SM_CYHSCROLL | Horizontal scroll arrow height |
| SM_CYCAPTION | Caption bar height |
| SM_CXBORDER | Window border width |
| SM_CYBORDER | Window border height |
| SM_CXDLGFRAME | Dialog window frame width |
| SM_CYDLGFRAME | Dialog window frame height |
| SM_CYVTHUMB | Vertical scroll thumb height |
| SM_CXHTHUMB | Horizontal scroll thumb width |
| SM_CXICON | Icon width |
| SM_CYICON | Icon height |
| SM_CXCURSOR | Cursor width |

-continued

| | |
|---|---|
| SM_CYCURSOR | Cursor height |
| SM_CYMENU | Menu bar height |
| SM_CXFULLSCREEN | Full screen client area width |
| SM_CYFULLSCREEN | Full screen client area height |
| SM_CYKANJIWINDOW | Kanji window height |
| SM_CYVSCROLL | Vertical scroll arrow height |
| SM_CXHSCROLL | Horizontal scroll arrow width |
| SM_CXMIN | Minimum window width |
| SM_CYMIN | Minimum window height |
| SM_CXSIZE | Minimize/Maximize icon width |
| SM_CYSIZE | Minimize/Maximize icon height |
| SM_CXFRAME | Window frame width |
| SM_CYFRAME | Window frame height |
| SM_CXICONSPACING | Horizontal icon spacing |
| SM_CYICONSPACING | Vertical icon spacing |

Section 66 of the dialog box 64 allows a user to select a scheme from a list of pre-defined schemes that each specify a single unique set of values for the system metrics that relate to window elements. The user saves, deletes or selects a particular system metrics scheme using section 66 of the dialog box 64. As shown in FIG. 5, section 66 includes a drop down list box 74 that lists the system metrics schemes that are currently saved by the operating system 48. The drop down list box 74 is shown in the closed state in FIG. 5 and in the closed state, shows only the currently selected system metrics scheme. Examples of window elements that are generated in accordance with the currently selected system metrics scheme are displayed in section 68. In the example of FIG. 5, the currently selected system metrics scheme is the "Easy Reading" system metrics scheme, in which all of the system-provided window elements have large system metrics values, is displayed in large letters.

The operating system 48 provides a number of predefined system metrics schemes, but the user also has the option of saving additional system metrics scheme by pressing the "Save Scheme" button 76. The user may initially begin with one of the previously saved system metrics schemes and then utilize section 70 of the dialog box 64 to further customize the size of particular system-provided window elements. The resulting system metrics values may be saved in a new scheme. Moreover, the user may remove a scheme from the list by pressing the "Remove Scheme" button 78.

Section 70 of the dialog box 64 (which concerns the system-provided window elements) includes a drop down list box 80 that holds a list of the system metrics for the system-provided window elements. The current size of the selected system metric is displayed in the "Element Size" box 82. In the example of FIG. 5, the "menu height" system metric is the currently selected system metric and the current menu height is "25". The user may click the mouse 44 on the upward arrow 84 to increase the element size and click the mouse on the downward arrow 86 to decrease the element size. In addition, the user may put the caret on the value and directly edit the value.

Referring once again to the flowchart of FIG. 4, the user requests a change in the dimension of the system-provided window element in step 58 by using the dialog box 64, as described above (FIG. 5). Subsequently, after the user has finalized the changes and exited the dialog box 64, the bitmaps stored in the bitmap cache 52 (FIG. 3) are re-drawn in response to the user request (step 60). In particular, every time that a user changes one of the system metrics for the system-provided window elements, the entire bitmap cache is re-drawn. The revised bitmap cache 52 may then be subsequently used to draw the system-provided window elements. The value selected for each of the system metrics persists until a new value is selected by the user.

The operating system 48 provides a separate routine for each system-provided window element to generate a new bitmap for the window element in step 60 of FIG. 4. Each time that the system metrics are changed, these routines are called to re-draw the bitmaps for the system-provided window elements. The routines operate quickly enough so that no substantial overhead is incurred in re-drawing the bitmaps that are stored in the bitmap cache 52. Although each of the routines has particularities that are unique to the nature of the system-provided window element which the routine draws, the basic approach of each of the routines is the same.

Figure 6:
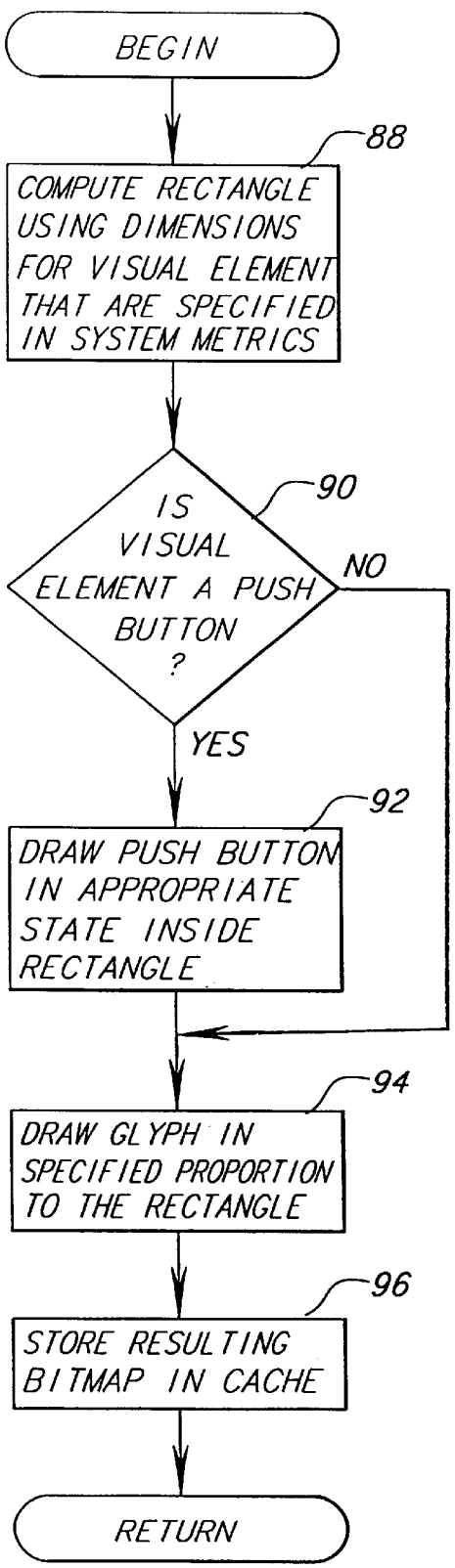
FIG. 6 is a flowchart illustrating how new bitmaps for window elements are drawn in accordance with the preferred embodiment of the present invention.

FIG. 6 is a flowchart showing the steps performed by these routines to draw the new bitmap of its corresponding window element. Initially, a rectangle is drawn to have the dimensions that are specified by fixed dimension values and a system metric value for the window element (step 88). For instance, the vertical scroll arrow width (e.g., SM_CXVSCROLL) is specified by a system metric and the vertical scroll arrow height is also specified by a system metric (i.e., SM_CYVTHUMB, because the thumb and scroll bar arrow have the same height). These values of the dimensions are used to compute a rectangle of the proper size for a vertical scroll arrow. The system then checks whether the visual element to be drawn is a push button (step 90). Push buttons are given special treatment because they may assume heights other than the zero level logical surface of the video display (i.e., they may not appear flat). Specifically, a push button may be raised or may be sunken below the zero level logical surface. Thus, if the visual element is a push button, the push button must be drawn in the appropriate state inside and including the rectangle (step 92). The push button may be drawn using conventional techniques. When the push button has been drawn or if the visual element is not a push button, a corresponding glyph for the window element is drawn. The glyph is the visible part of a character or other graphical entity that is shown in a bitmap. For example, the arrow portion of the vertical scroll bar arrow 28 visual element (FIG. 1) constitutes a corresponding glyph. The glyph is drawn to have size that is in a specified proportion relative to the dimensions of the rectangle (step 94). The proportional size of a glyph to the rectangle is empirically defined and is chosen for each element to ensure its best appearance.

Once the bitmap for the system-provided visual element has been completely generated, the resulting bitmap is stored in the bitmap cache 52 (FIG. 3) along with the other bitmaps (step 96 in FIG. 6). Thus, the revised bitmap may be used in all future calls by the system or application programs to draw the corresponding system-provided window element on the video display 46 or printer 47.

The operating system 48 provides a number of functions in the form of application programming interfaces (APIs) that relate to the window elements that have adjustable dimensions. A first of these functions if the SetMenuItemInfo( ) function. This function allows an \ program to manipulate a MENUITEMINFO structure, which is defined as follows:

```
typedef struct tagMENUITEMINFO {
    DWORD dwMask;     // members to get or set
    DWORD fType;      // menu item type
```

-continued

```
    DWORD fState;     // menu item state
    UINT wID;         // menu item identifier
    HMENU hSubMenu;   // handle to popup menu
    HBITMAP hbmpChecked;    // handle to bitmap checked
    HBITMAP hbmpUnchecked;  // handle to bitmap unchecked
    LPSTR dwTypeData; // content of the menu item
    WORD cdh;         // char count of menu content
    DWORD dwITemData; // application-defined item data
} MENUITEMINFO, FAR *LPMENUITEMINFO;
```

The MENUITEMINFO structure maintains information about items in the menu. Of particular interest to the preferred embodiment of the present invention are the hbmpChecked and hbmpunchecked fields that hold handles (i.e., unique numerical identifiers) for bitmaps. The hbmpchecked field holds the handle to a bitmap to represent the checked state, whereas the hbmpunchecked holds a handle for a bitmap in the unchecked state. When a user later changes the size of the menu by changing the font size, the application may easily provide a handle to a different bitmap that is scaled properly to the new font size of the menu. Thus, this structure helps to greatly simplify the scalability of menus.

Another relevant function provided by the operating system 48 is the GetMenuItemInfo( ) function. This function may be viewed as the converse of the SetMenuItemInfo( ) function in that it interrogates information from the MENUITEMINFO structure.

The CheckMenuRadioItem( ) function provides a vehicle for checking or unchecking a menu item with the bitmaps specified in the MENUITEMINFO structure.

The DrawFrameControl( ) function allows an application to draw one of a number of system supplied icons (like the icons 12, 18, 20, and 28 in FIG. 1) in the applications space. This function allows an application to use a system to provide individual elements without having to draw these elements at a proper size.

Two functions are provided by the operating system 48 that concerns scroll bars. The SetScrollInfo( ) function allows an application to manipulate scroll bar size and thumb position. The GetScrollBarInfo( ) function allows an application to retrieve information regarding the scroll bar size and thumb position.

The SystemParametersInfo( ) function is provided by the operating system 48 to enable an application to query or set system wide parameters. The system wide parameter to query or set is specified by a parameter that is passed to the function call. Amongst the possible values for this parameter is the SPI_SETNONCLIENTMETRICS value and the SPI_GETNONCLIENTMETRICS parameter. These parameter values are specified to either set or retrieve the various sizes of system visual elements that are defined within the operating system 48, as discussed above.

When the present invention has been described with reference to a preferred embodiment thereof, those skilled in the art will appreciate that various changes in form and detail may be made without departing from the present invention as defined in the appended claims.

What is claimed is:

1. In a computer system having an output device and a processor that runs an operating system having a graphical user interface and an application program that outputs a window on the output device, a method comprising the computer-implemented steps of:

with the operating system, storing icons within a bitmap cache for outputting to the application program and the graphical user interface of the operating system for use as window elements;

providing a function in the operating system for outputting one of the icons stored within the bitmap cache to the output device and for globally requiring said outputted one of the icons to be utiized by the application program and the graphical user interface of the operating system; and calling the function by the application program to draw said outputted one of the icons in the window of the application program and the graphical user interface of the operating system as a window element based on the operating system's system metrics of the outputted one of the icons.

2. The method of claim 1 wherein, in response to user input, the operating system changes the metrics of an icon stored in the bitmap cache.

3. The method of claim 2 wherein changing the metrics of an icon stored in the bitmap cache results in the bitmap of the window element being redrawn by the operating system and stored in the bitmap cache for outputting by the operating system.

4. The method of claim 3 wherein the icons stored in the bitmap cache are completely redrawn by the operating system after each change to the metrics of an icon, said redrawing including a new icon based on the changed metrics as well as the existing contents of the bitmap cache.

5. The method of claim 3 wherein the icons stored in the bitmap cache and outputted by the operating system are redrawn independently of window size.

6. A computer-readable medium containing computer-implementable instructions for carrying out the method of any one of claims 1–5.

\* \* \* \* \*

UNITED STATES PATENT AND TRADEMARK OFFICE
CERTIFICATE OF CORRECTION

PATENT NO.    : 6,262,733 B1  
DATED         : July 17, 2001  
INVENTOR(S)   : J.L. Bogdan Page 1 of 1

It is certified that error appears in the above-identified patent and that said Letters Patent is hereby corrected as shown below:

Title page,  
Item [62], Related U.S. Application Data, "Pat. No. 5,903,265," should read -- abandoned, --

Column 1,  
Line 7, "APPLICATION" should read -- APPLICATIONS --  
Lines 11-12, "U.S. Pat. No. 5,903,265" should read -- abandoned, --  
Line 52, "10, likewise, includes" should read -- 10 likewise includes --  
Line 62, "seroll" should read -- scroll --

Column 2,  
Line 32, "means-holding" should read -- means holding --

Column 3,  
Line 57, "pixeis" should read -- pixels --

Column 4,  
Line 26, "closed state," should read -- closed state --  
Line 34, "values, is displayed" should read -- values displayed --  
Line 37, "metrics scheme" should read -- metrics schemes --

Column 5,  
Line 58, "functions if" should read -- functions is --

Column 6,  
Lines 15 and 18, "hbmpunchecked" should read -- hbmpUnchecked --  
Line 17, "ubmpchecked" should read -- hbmpChecked --  
Line 39, "concerns" should read -- concern --  
Line 50, "is the" should read -- are the --

Signed and Sealed this

Ninth Day of April, 2002

*Attest:*

JAMES E. ROGAN  
*Director of the United States Patent and Trademark Office*

*Attesting Officer*